H. W. ALLEN.
CARBURETER.
APPLICATION FILED MAY 22, 1914.
1,140,232.
Patented May 18, 1915.
2 SHEETS—SHEET 2.
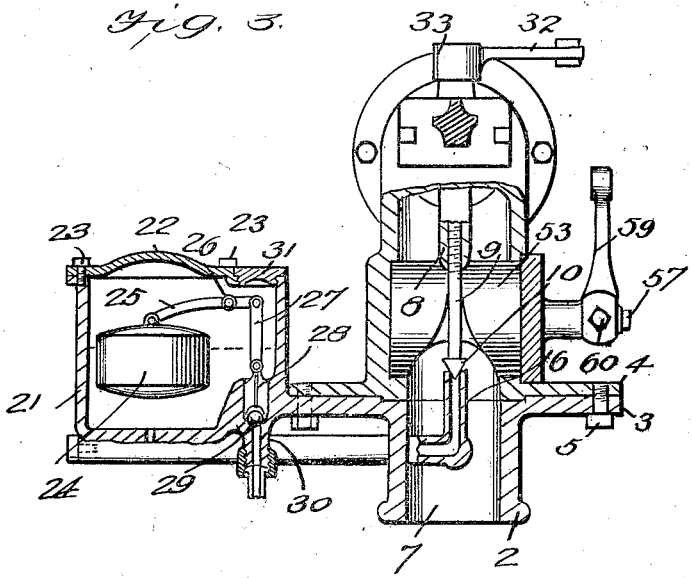
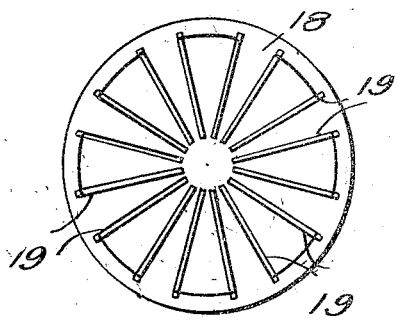
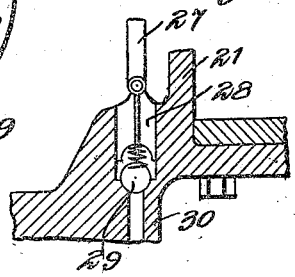
WITNESSES
INVENTOR
Herbert W. Allen
BY Munn & Co.
ATTORNEYS

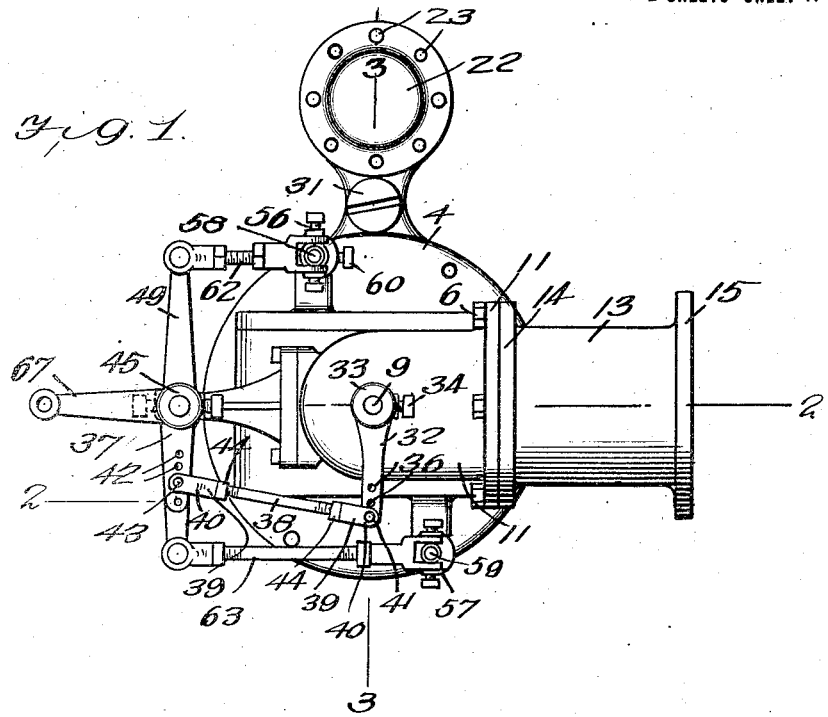

UNITED STATES PATENT OFFICE.

HERBERT WILLIAM ALLEN, OF COALINGA, CALIFORNIA.

CARBURETER.

1,140,232.  Specification of Letters Patent.  Patented May 18, 1915.

Application filed May 22, 1914. Serial No. 840,237.

*To all whom it may concern:*

Be it known that I, HERBERT W. ALLEN, a citizen of the United States, and a resident of Coalinga, in the county of Fresno and State of California, have invented an Improvement in Carbureters, of which the following is a specification.

My invention is an improvement in carbureters, and has for its object to provide a device of the character specified, wherein dampers are arranged between the inlet and the outlet of the carbureter for controlling the passage of the fuel and the air therethrough, and wherein a valve is provided for controlling the supply of fuel and wherein a controlling shaft is provided connected to the dampers and to the valve, for simultaneously operating both valve and damper.

A further object is to provide a new and improved form of baffle, for use in the mixing chamber, to insure the thorough and uniform mixture of the fuel and the air.

In the drawings: Figure 1 is a top plan view of the improved carbureter; Figs. 2 and 3 are sections on the line 2—2 and 3—3 respectively, of Fig. 1; Fig. 4 is a top plan view of a mixing chamber baffle, Fig. 5 is a transverse section of the same, and Fig. 6 is an enlarged sectional view showing the ball valve and its holding spring.

The present embodiment of my invention comprises a casing consisting of an upper section 1, and a lower section, the said section comprising a tubular body 2 and a marginal flange 3 integral with the body and lapping on a similar flange 4 of the upper section.

Screws 5 are passed through openings in the flange 3 and engage threaded openings in the flange 4, to secure the sections together. The section 2—2 is provided with an elbow, the said elbow consisting of an arm 6 at the axis of the body, and an arm 7 extending at right angles to the arm 6, and passing out through the body of the said lower section.

The upper section is provided with an internally threaded sleeve 8, in alinement with the arm 6 of the elbow, and a needle valve 9 is threaded through the sleeve. The lower end of the needle valve has a conical head 10, which fits within the upper end of the arm 6, coöperating with the said upper end as a seat, to close the inner end of the elbow. The upper section is also provided with an upwardly extending elbow 11 which opens laterally, in the opposite direction to the arm 7, and the said elbow is provided with a marginal flange 12 at its outer end.

The elbow 11 is the outlet of the upper section of the casing, and a cylindrical mixing chamber 13 is connected with the elbow, the said chamber having flanges 14 and 15 respectively at its ends, and the flange 14 fits against the flange 11 of the elbow, and is secured thereto by screws 16, as shown. A series of the baffles shown in Figs. 4 and 5 is arranged within the cylindrical casing 13, and the said casing is internally enlarged or reamed, as shown at 17, to receive the baffles.

Each of the baffles is formed from a disk 18 of metal of suitable diameter and thickness, the disk being radially slotted at spaced intervals, and at the outer end of each of the radial slots an arch shaped slot is provided extending transversely of the radial slot. The material at each side of the radial slot is then bent laterally, to form for each radial slot a pair of laterally extending wings or vanes 19. The radial slots are spaced apart from the center of the disk at their inner ends, as shown in Fig. 4, and each wing or vane 19 is of greatest height at its outer end, gradually decreasing in height toward the center of the disk.

The individual baffles are separated by rings 20, which are of a size to fit closely within the casing 13. One of the rings 20 is arranged at the inner end of the casing, and a baffle is fitted in the casing adjacent to the ring. A second ring is then placed and a second baffle, and the rings and the baffles are arranged alternately, until the casing is filled, a ring being last inserted.

The float chamber 21 is a cylindrical casing, having a removable head 22, connected to the casing by screws 23, and the float 24 within the chamber is pivoted to one end of a lever 25. The lever is pivoted to the casing intermediate its ends as indicated at 26 and a link 27 connects the opposite end of the lever from the float with a guide 28 of cross or X shape. A ball valve 29 is arranged at the lower end of the guide, and the ball seats at the inner or upper end of the bore of a nipple 30. The float chamber 21 is provided with a radial extension at the side adjacent to the casing 1, within which the link 27 and the guide 28 are placed, and a plug 31 is threaded into an opening at the top of the casing, to permit access to the link, the guide and the valve.

The float chamber is connected to the lower section 2 of the carbureter by an integral connection with the flange 3, before mentioned. The needle valve 9, before mentioned, extends through the elbow 11, the sleeve 8 extending above and below the upper wall of the elbow, and an arm 32 is provided with a bearing 33 which fits over the upper end of the valve, and a set screw 34 is threaded through the bearing into engagement with the needle valve, to secure the arm thereto.

The upper end of the sleeve 8 is reamed or counter-bored, and a coiled spring 35 is seated in the reamed or counter-bored portion, the upper end of the spring bearing against the bearing 33 of the arm. The outer end of the arm is provided with a longitudinal series of openings 36, and the arm is connected to one end of the lever 37 by means of a connecting rod 38. The rod 38 has its ends threaded and each of the said ends is engaged with an internally threaded socket 39, each socket having a pair of parallel arms 40 extending longitudinally of the rod 38.

The arms 40 of one of the sockets engages opposite faces of the link 36, and the said arms have openings registering with each other, and adapted to register with one of the openings 36 of the arm, to receive a pin 41 for pivoting the arms to the arm 32. The arms of the other socket engage opposite faces of the lever 37, and the lever is provided with a longitudinal series of openings 42, with one of which the openings of the arms are adapted to register for receiving a pivot pin 43.

Lock nuts 44 are arranged on the rod 38 at each socket, to hold the sockets in adjusted position. The ends of the rods 38 are oppositely threaded, and it will be obvious that the distance between the arm 36 and the lever 37, that is the effective length of the rod 38, may be varied. The lever 37, before mentioned, is provided with a central bearing 45 which is journaled on a control shaft 46, held in bearing arms 47 and 48 extending laterally from the upper section 1 of the carbureter casing. The lower end of the shaft 46 is reduced, and the reduced portion engages the bearing arm 48, the shoulder formed between the reduced portion and the body portion engaging the upper face of the bearing arm. A lever 49 is provided with a central bearing for engaging the control shaft, and the said lever is arranged between the bearing arms 47 and 48.

The bearings 45 for the lever 37 and 50 for the lever 49 are held to the control shaft by set screws 51, and the opposite ends of the levers 49 are connected to the dampers. The dampers 52 and 53 are arranged within the casing 1, on opposite sides of the needle valve 9. Each damper is a cylindrical body, arranged to rotate within a cylindrical chamber 54 for the damper 52 and 55 for the damper 53, formed in the casing 1. Each damper is provided with an axial stem 56 and 57 respectively, and arms 58 and 59 are connected with the respective journal pins. Each arm is provided with a bearing for engaging the journal pin, and sets screws 60 are threaded through the arms into engagement with the journal pin, to hold the arms in adjusted position on the pins.

Each of the dampers is, as before stated, approximately cylindrical, but intermediate its ends each damper is provided with a circumferential passage.

Referring to Figs. 2 and 3, it will be evident that when dampers 52 and 53 are in the position shown in Fig. 2, the inlet through the carbureter will be practically closed, while when the dampers return to bring the circumferential passages 61 adjacent, there will be a passage for the fuel issuing from the elbow 6—7, and for the air entering through the lower section or head 2 of the carbureter.

Each end of the lever 49 is connected to the adjacent damper, the connection to one damper being by means of a connecting rod 62 and to the other damper by means of a connecting rod 63. The connecting rods 62 and 63 correspond to the connecting rod 38—39—40, before described. The connection of the connecting rod with the controlling arm of the damper is a universal joint connection, as is also the connection of the said rod 62 and 63 with the lever 49, as shown in Figs. 1 and 2.

The dampers 52 and 53 are engaged longitudinally and at their outer and lower sides by means of shoes 64, each of the shoes being arranged within a recess 65 extending longitudinally of the adjacent chamber 54 or 55. The face of the shoe that engages the damper is shaped to fit the damper closely, and the shoes are pressed into close contact with the dampers by springs 66, the said springs being arranged within the recesses beneath the shoes. The shoes act also as packing rings, for the dampers.

The manifold of the engine will be connected to the flange 15 of the mixing chamber, and an arm 67 is connected to the upper end of the control shaft 46, above the lever 37. The said arm 67 is provided with a bearing encircling the shaft, and a set screw 68 holds the bearing to the shaft. The arm 67 is the control lever for the carbureter.

The shoes 64 hold the dampers in rolling contact at their adjacent faces, and the passages 61 increase gradually in capacity or cross sectional area, the passage extending over approximately half the circumference of each cylinder. The coil spring 35 of the needle spray valve is a thrust spring relieving the screw threads of wear in one direction, and eliminating irregularities. The control shaft 46 when oscillated in either direction will oscillate the dampers in a direction to open or close the passage for the fuel and air, that is to make the said passage of greater or of less area. The control shaft also controls the needle valve, so that the amount of gasolene admitted and the amount of air admitted are both controlled by the same control shaft. After the elements have been adjusted to provide for the desired relative proportion of the fuel and air, the relative amount of the mixture is afterward controlled in accordance with conditions. The extent of the movement of the cylinder dampers and the extent of the movement of the needle valve may be varied by the connecting rods 38, 62 and 63, in accordance with the character of fuel used. The float 24 maintains the fuel at a certain predetermined level in the vertical arm 6 of the elbow 6 and 7.

The connection between the control shaft and the needle valve and the dampers is only varied for different characters of fuel; and with a fuel of a certain character, when once adjusted no further adjustment is required, since the carbureter will give at all times the proper proportion of fuel and air, and at all positions, so that under all conditions there is a uniform mixture provided.

The ball valve 29 sets in a pocket in the lower end of the guide 28, and a coil spring is provided for holding the ball in the pocket. It is obvious however that the guide 28 might be provided with a cage at its lower end for holding the ball.

In operation the parts having been once adjusted, the control of the fuel and the air is by way of the arm or lever 67. When the lever or arm is moved in one direction the needle valve will be open, and the dampers will be moved to admit the mixture. The air enters by way of the port 2, and vaporizes a portion of the liquid fuel in the arm 6 of the elbow, and carries the vaporized fuel through the elbow 11, and through the mixing chamber to the manifold of the engine. The vanes 19 of the baffles and the baffles themselves insure a thorough, complete and uniform mixture of the fuel and air.

The ball valve 29 is as before stated held normally closed on its seat, by means of a spring 29ª, which is arranged between the ball and the lower end of the guide 28.

What I claim as new and desire to secure by Letters Patent is as follows:—

1. A carbureter comprising a casing having a lateral outlet at its top and an inlet at the lower end, a fuel supply pipe opening into the carbureter at the inlet and having a vertical portion at the axis of the inlet, means for supplying fuel to the supply pipe and for retaining the fuel at a predetermined level in the vertical portion of the supply pipe, a needle valve coöperating with the upper end of the vertical portion of the supply pipe, the casing having an internally threaded sleeve in alinement with the vertical portion of the supply pipe and the needle valve having a threaded engagement with the sleeve, said casing having cylindrical chambers between the sleeve and the inlet and extending transversely of the needle valve and on opposite sides thereof, approximately cylindrical dampers in the chambers and contacting at their adjacent sides, each damper having a circumferentially extending passage intermediate its ends, the passages registering, and gradually increasing in cross sectional area toward one end, a controlling shaft journaled parallel with the needle valve, the needle valve and the shaft having registering radial arms, and an extensible and contractible connection between the arms, a lever secured to the shaft intermediate the ends of the lever, each damper having an axial extension at one end, and the extensions being at the opposite ends of the casing, each extension having a radial arm, and an extensible and contractible connection between each arm and the adjacent end of the last named lever.

2. A carbureter comprising a casing having a lateral outlet at its top and an inlet at the lower end, a fuel supply pipe opening into the carbureter at the inlet and having a vertical portion at the axis of the inlet, means for supplying fuel to the supply pipe and for retaining the fuel at a predetermined level in the vertical portion of the supply pipe, a needle valve coöperating with the upper end of the vertical portion of the supply pipe, the casing having an internally threaded sleeve in alinement with the vertical portion of the supply pipe and the needle valve having a threaded engagement with the sleeve, said casing having cylindrical chambers between the sleeve and the inlet and extending transversely of the needle valve and on opposite sides thereof, approximately cylindrical dampers in the chambers and contacting at their adjacent sides, each damper having a circumferentially extending passage intermediate its ends, the passages registering, and gradually increasing in cross sectional area toward one end, a controlling shaft journaled parallel with the needle valve, the needle valve and the shaft having registering radial arms, and an extensible and contractible connection between the arms, and a connection between the controlling shaft and the dampers for simultaneously moving the dampers in the same direction.

3. A carbureter comprising a casing having a lateral outlet at its top and an inlet at the lower end, a fuel supply pipe opening into the carbureter at the inlet and having a vertical portion at the axis of the inlet, means for supplying fuel to the supply pipe and for retaining the fuel at a predetermined level in the vertical portion of the supply pipe, a needle valve coöperating with the upper end of the vertical portion of the supply pipe, the casing having an internally threaded sleeve in alinement with the vertical portion of the supply pipe and the needle valve having a threaded engagement with the sleeve, said casing having cylindrical chambers between the sleeve and the inlet and extending transversely of the needle valve and on opposite sides thereof, approximately cylindrical dampers in the chambers and contacting at their adjacent sides, each damper having a circumferentially extending passage intermediate its ends, the passages registering, and gradually increasing in cross sectional area toward one end, and a common means for simultaneously moving the dampers in opposite direction and for controlling the needle valve.

4. A carbureter comprising a casing having an inlet at its lower end and a lateral outlet at its upper end, a fuel supply pipe held at the axis of the inlet, means in connection with the carbureter for retaining fuel at a predetermined level in the said supply pipe, a valve coöperating with the upper end of the supply pipe for controlling the fuel supply, said casing having cylindrical chambers extending transversely of the supply pipe and between the same and the outlet, cylindrical dampers in the chambers and contacting at their adjacent surfaces, each damper having intermediate its ends a circumferential passage extending over approximately half the circumference of the damper and gradually increasing in cross sectional area in one direction, a common means for simultaneously moving the dampers in a direction to open or close the communication between the inlet and outlet and to simultaneously open and close the valve, said casing having at the outer side of said chambers and near the lower side thereof a passage extending longitudinally of the chamber, a shoe within each recess and contacting with the face of the adjacent dampers, and springs seated in the recesses beneath the shoes.

HERBERT WILLIAM ALLEN.

Witnesses:
G. H. SNYDER,
R. S. MOUNT.